11 Sheets—Sheet 1.
H. A. HOUSE.
Paper Bag Machine.
No. 237,111. Patented Feb. 1, 1881.
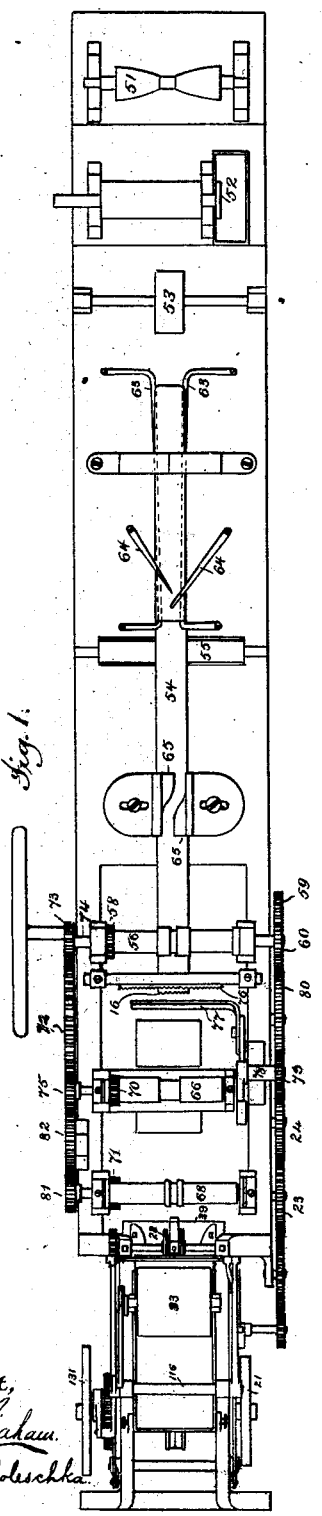
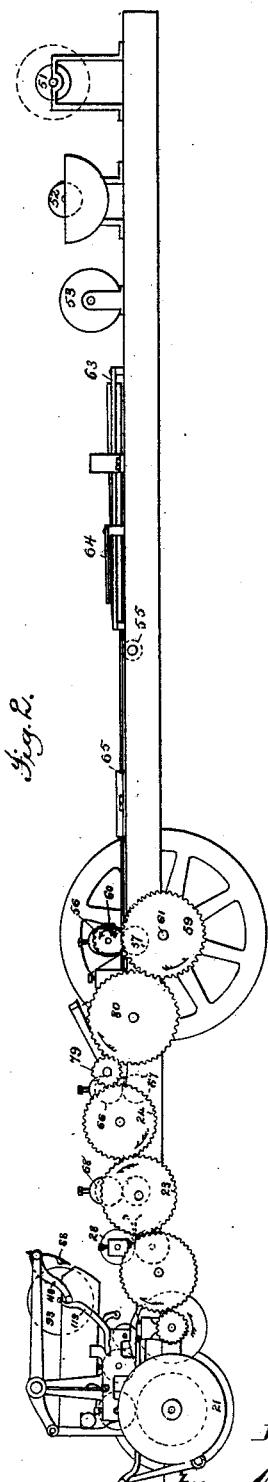
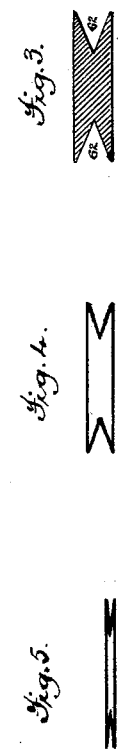
Attest,
Geo. N. Graham.
John Boleschka.
Inventor,
Henry A. House,
by Munson & Philipp,
Attys.

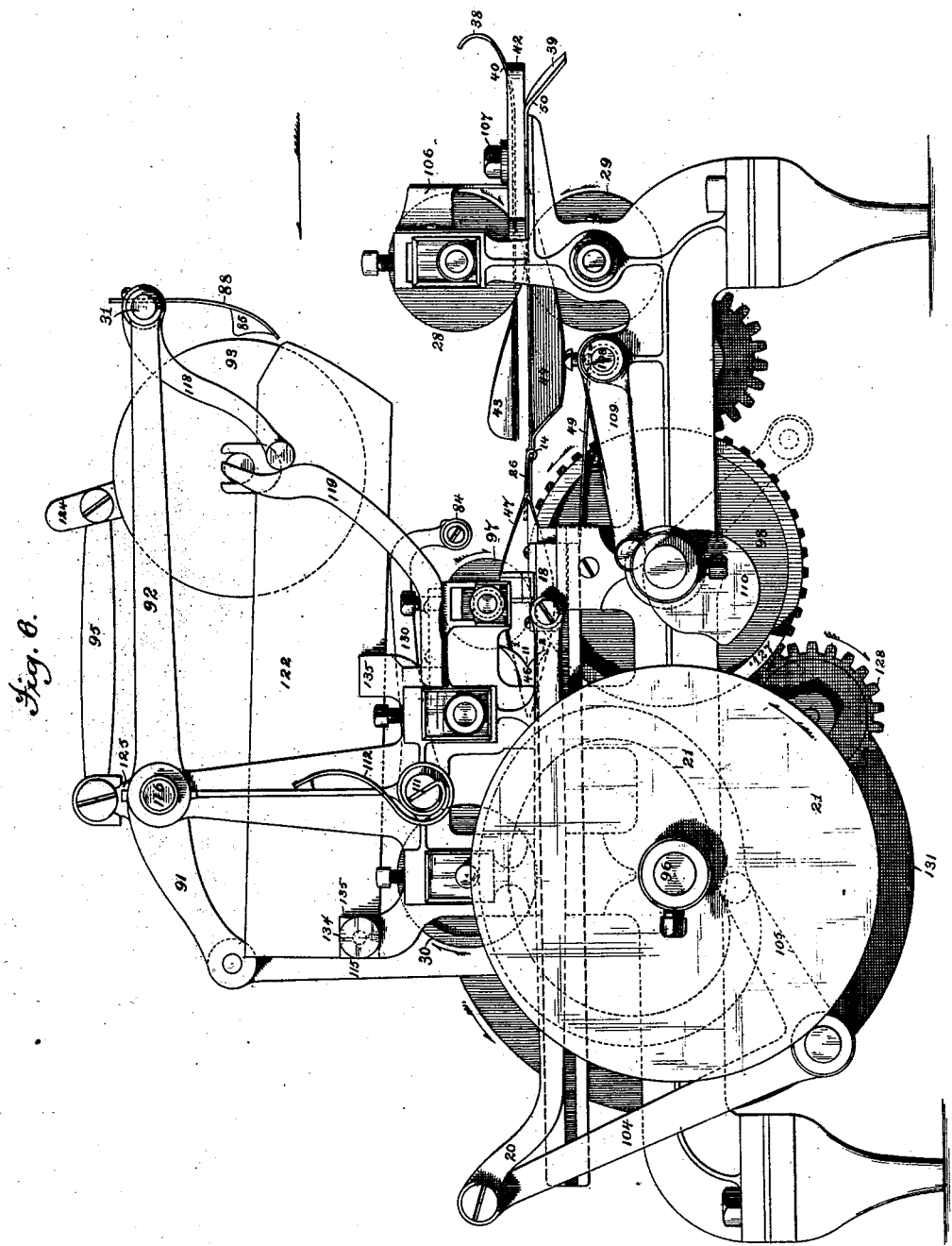

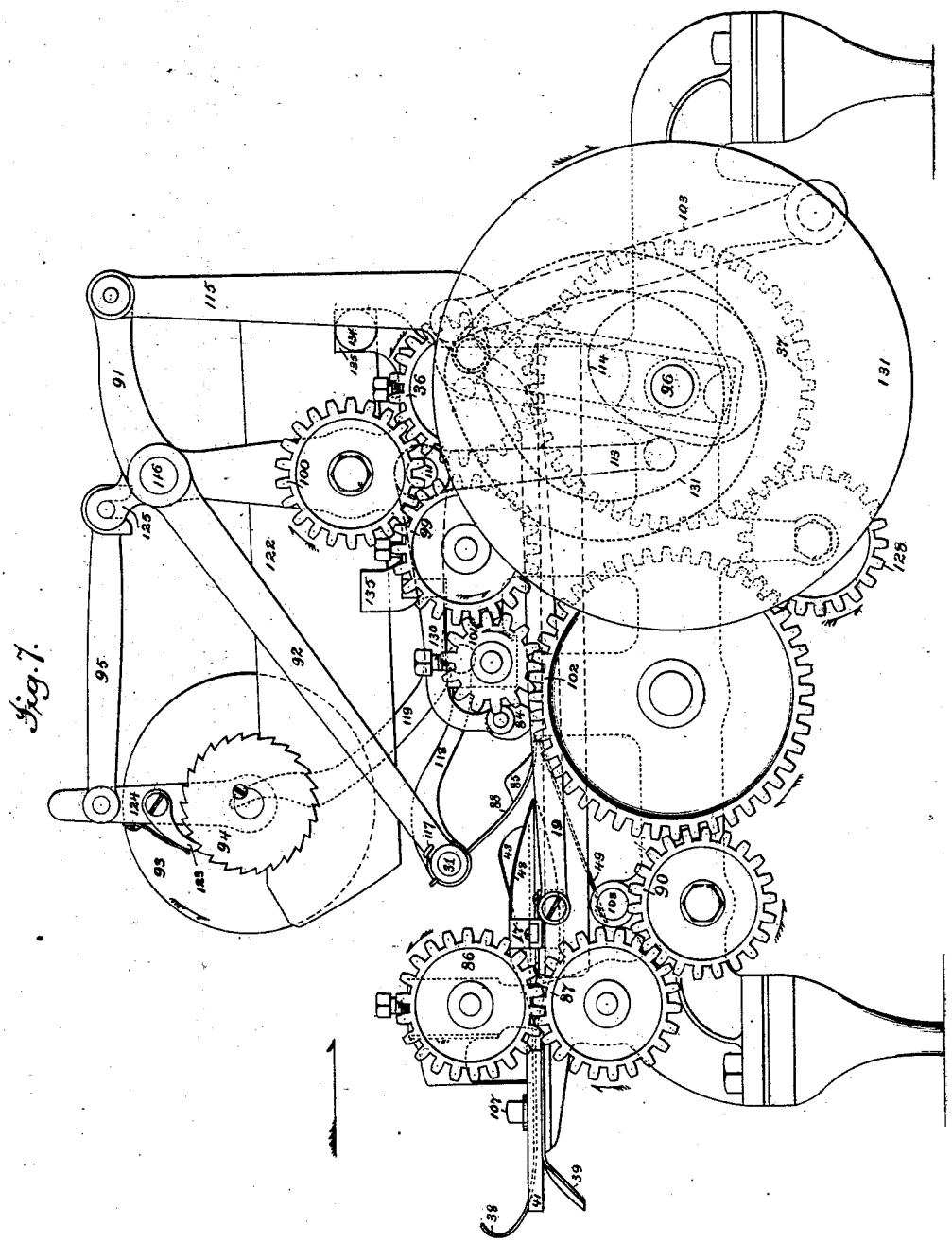

H. A. HOUSE.
Paper Bag Machine.
No. 237,111. Patented Feb. 1, 1881.
11 Sheets—Sheet 4.
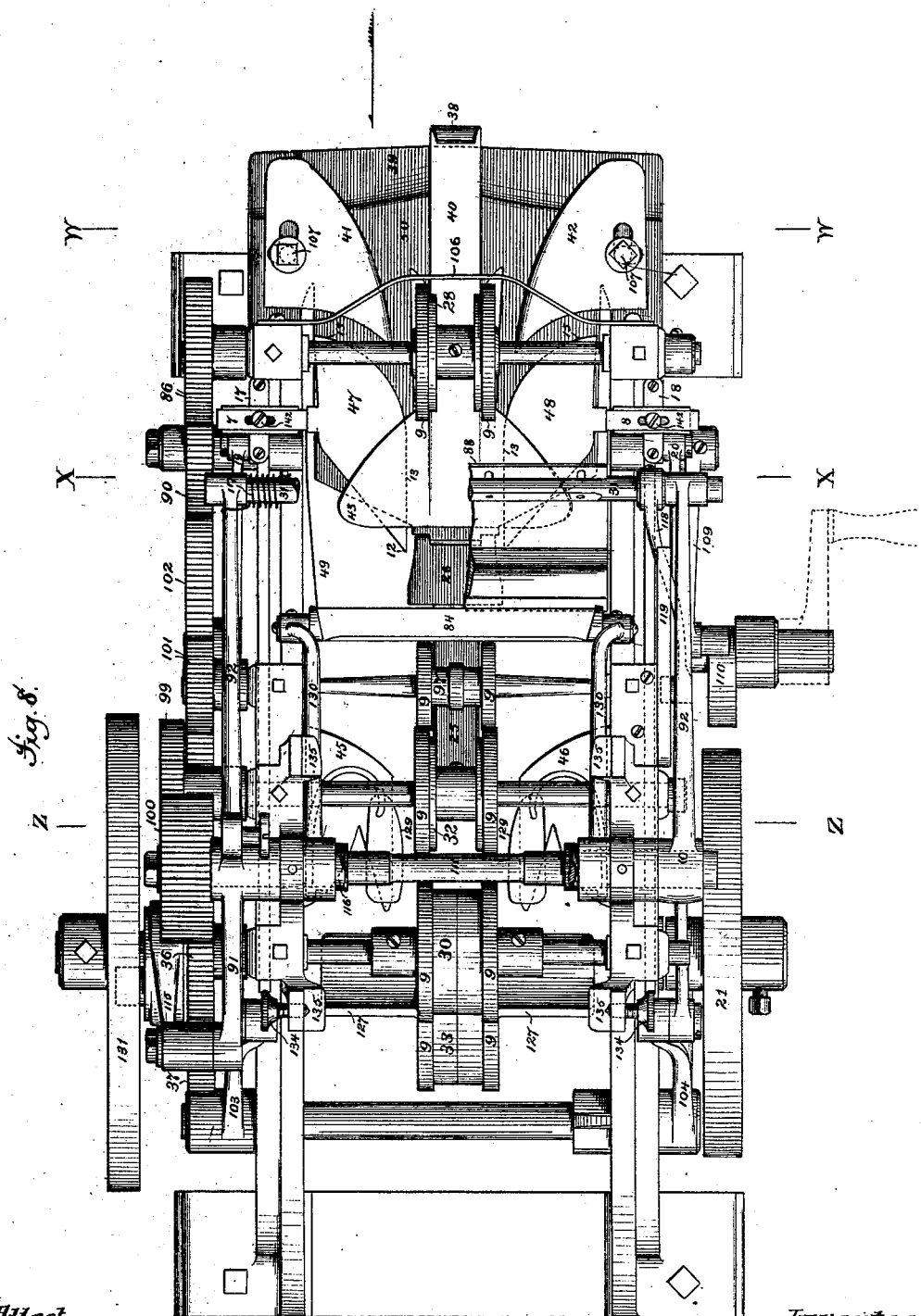
Attest,
Geo. W. Graham
John W. Boleschka
Inventor,
Henry A. House,
by Munson & Philipp
Att'ys.

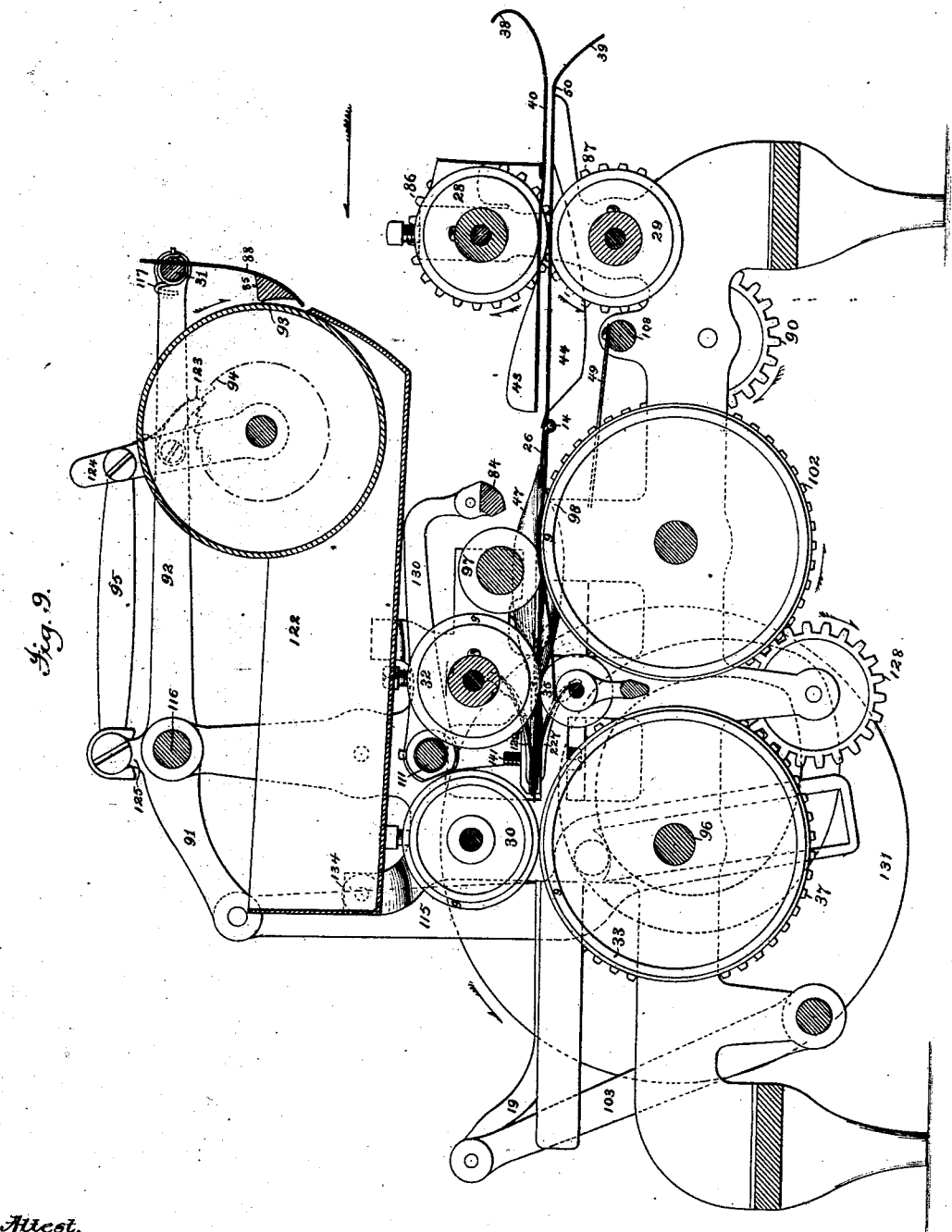

H. A. HOUSE.
Paper Bag Machine.

No. 237,111.                    Patented Feb. 1, 1881.

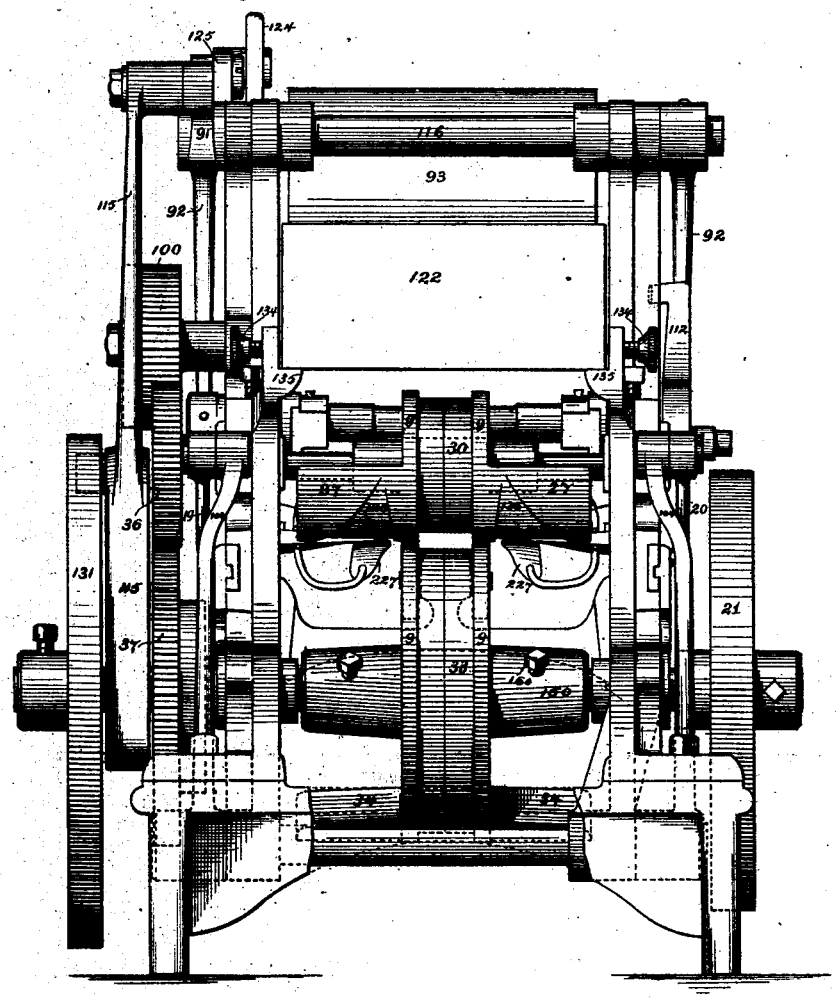

H. A. HOUSE.
Paper Bag Machine.
No. 237,111. Patented Feb. 1, 1881.
11 Sheets—Sheet 8.
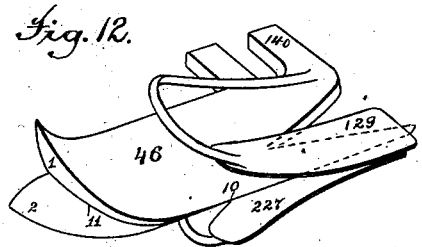
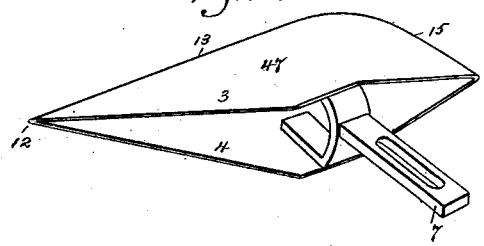
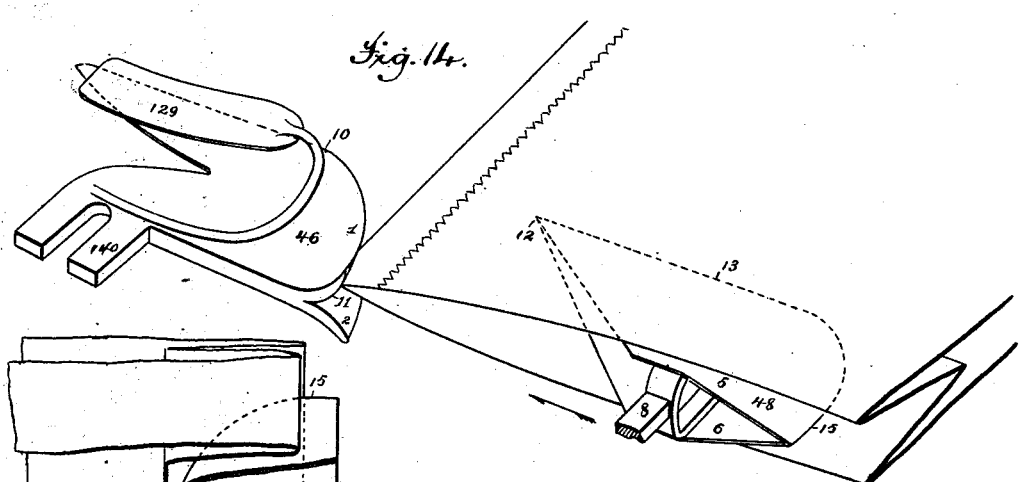
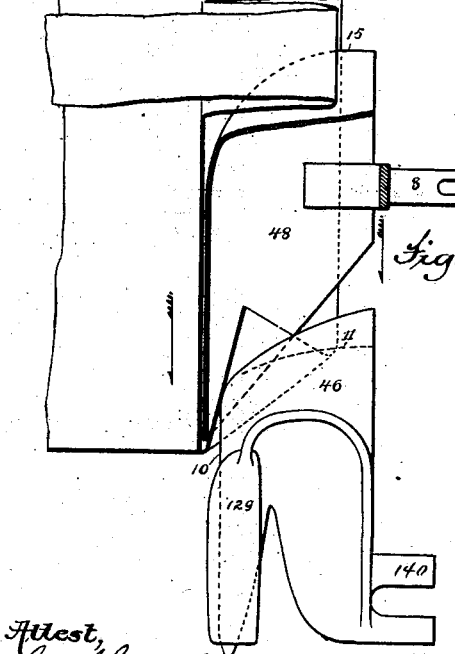
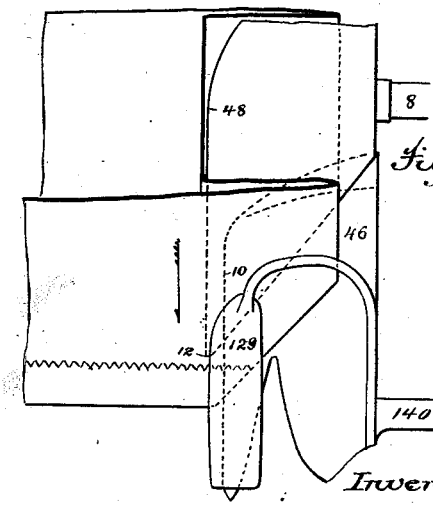

11 Sheets—Sheet 9.

H. A. HOUSE.
Paper Bag Machine.

No. 237,111. Patented Feb. 1, 1881.

Attest,
G. M. Graham
John Boleschka

Inventor,
Henry A. House,
by Mauson & Philipp
Attys.

11 Sheets—Sheet 10.

H. A. HOUSE.
Paper Bag Machine.

No. 237,111.  Patented Feb. 1, 1881.

Attest,
Geo. H. Graham
John Boleschka

Inventor,
Henry A. House,
by Munson & Philipp
Attys.

H. A. HOUSE.
Paper Bag Machine.
No. 237,111.
11 Sheets—Sheet 11.
Patented Feb. 1, 1881.
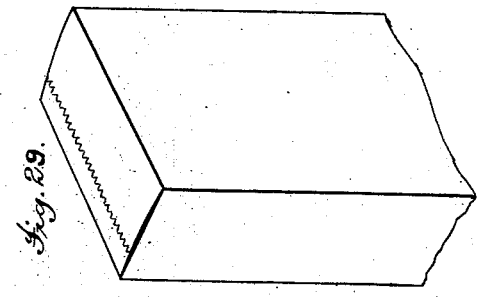
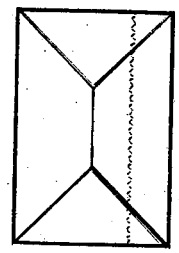
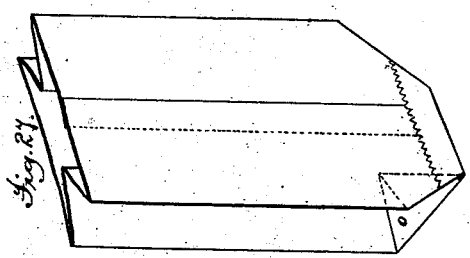
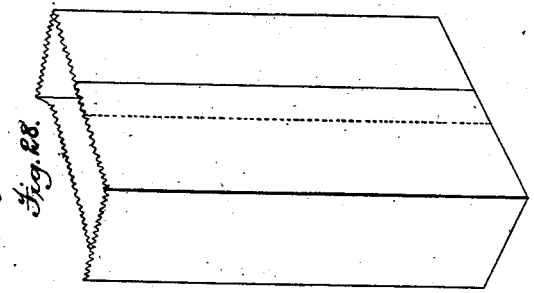
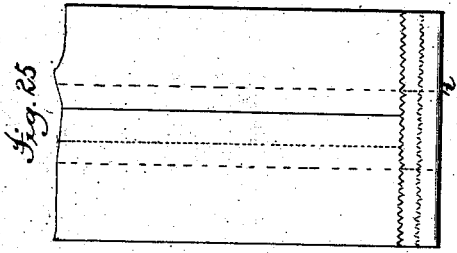
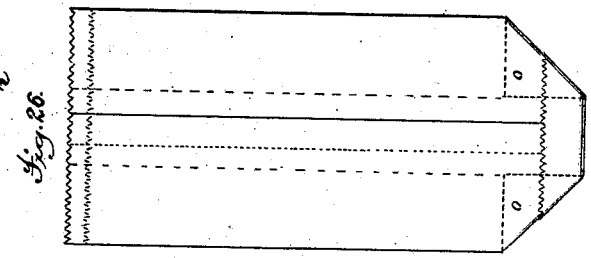
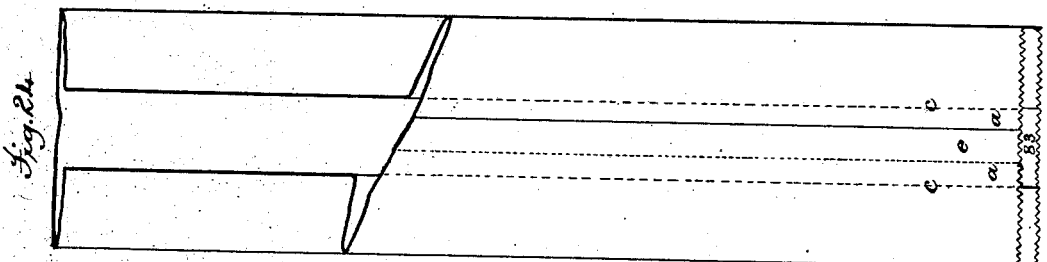
Attest,
G. M. Graham.
John S. Boleschka.
Inventor,
Henry A. House,
by Munson & Philipp
Attys.

UNITED STATES PATENT OFFICE.

HENRY A. HOUSE, OF BRIDGEPORT, CONNECTICUT, ASSIGNOR TO THE UNION PAPER BAG MACHINE COMPANY, OF PHILADELPHIA, PA.

PAPER-BAG MACHINE.

SPECIFICATION forming part of Letters Patent No. 237,111, dated February 1, 1881.

Application filed June 7, 1879.

*To all whom it may concern:*

Be it known that I, HENRY A. HOUSE, of the city of Bridgeport, county of Fairfield, State of Connecticut, have invented certain new and useful Improvements in Machines for Making Paper Bags; and I do hereby declare that the following specification, when taken in connection with the accompanying drawings, is such a full, clear, and exact description of the invention as will enable others skilled in the art to make and use the same.

Figure 10:
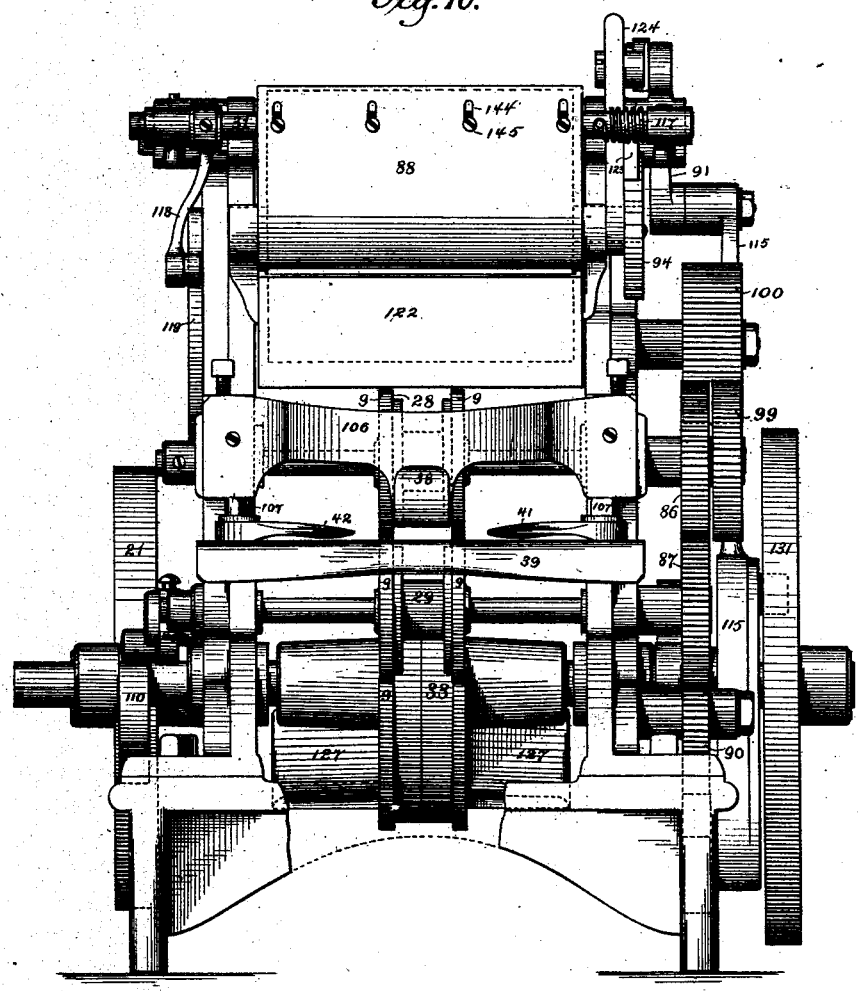
Figure 23:
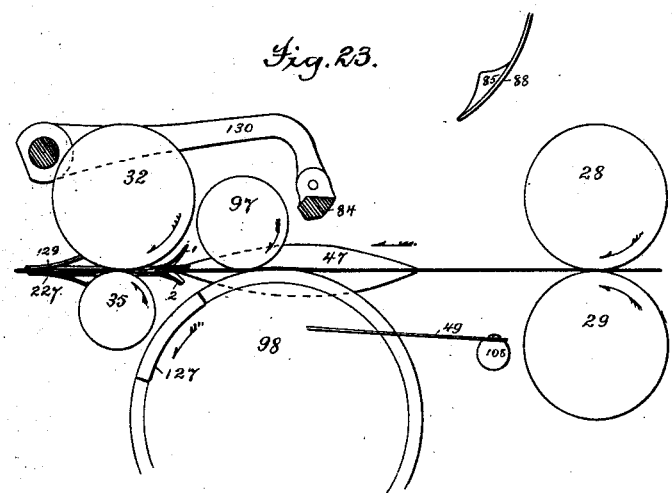
Figure 17:
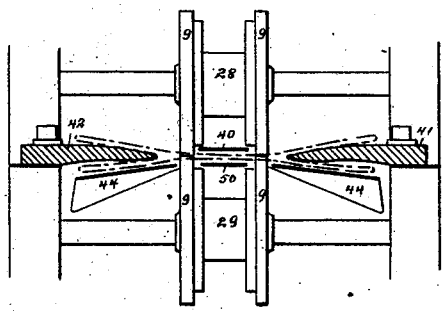
Figure 18:
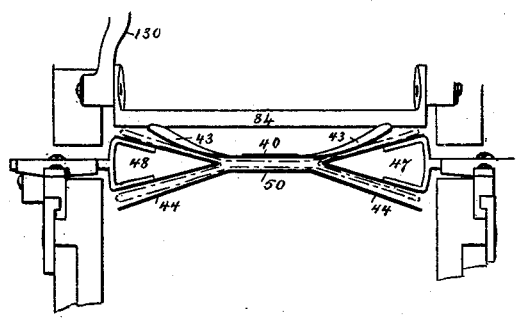
Figure 19:
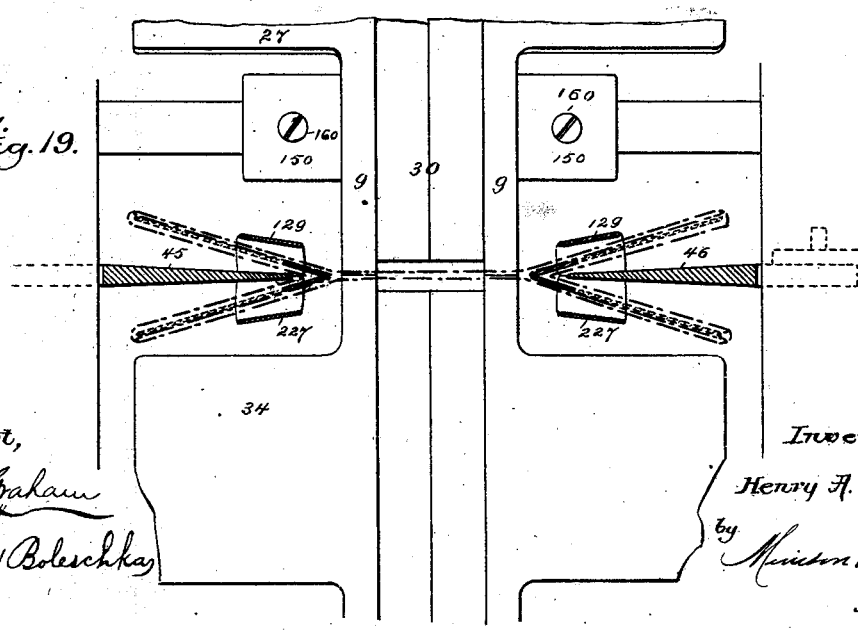
Figure 20:
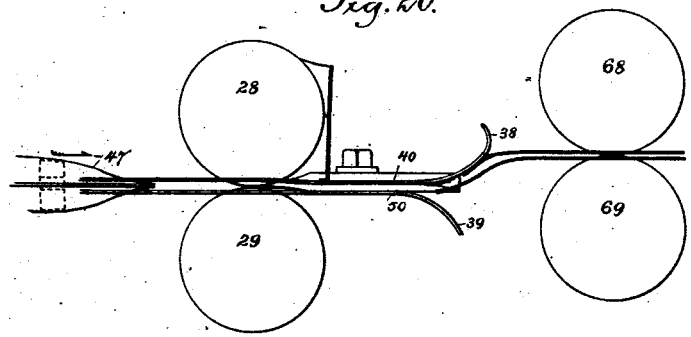
Figure 21:
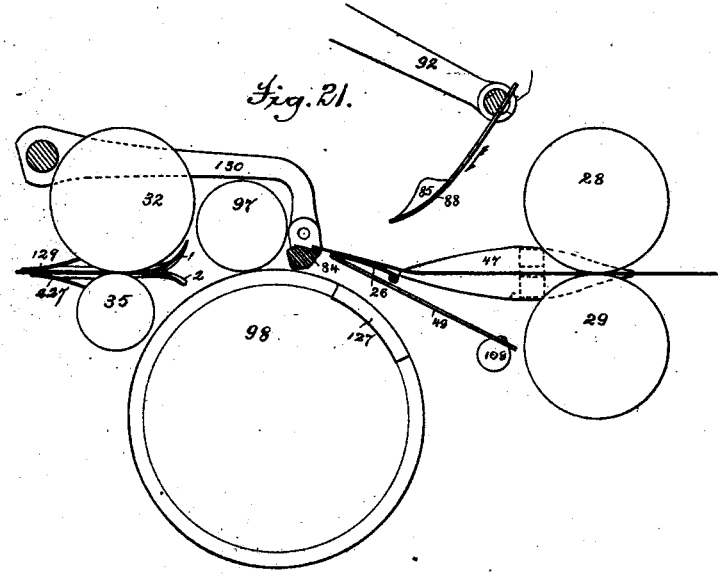
Figure 22:
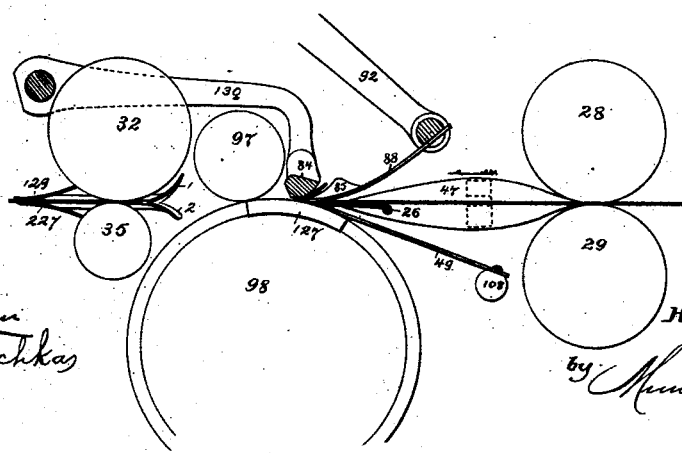

In said drawings, Figure 1 illustrates by a plan view, and Fig. 2 by a side elevation, a tube-forming machine as supplied with my improvements, whereby perfect bags are produced, Fig. 3 illustrating its "former" by a transverse sectional view. Figs. 4 and 5 represent sectional views of the bag-tube in two conditions of its formation. Fig. 6 represents one side elevation, Fig. 7 another side elevation, Fig. 8 a plan view, Fig. 9 a longitudinal sectional elevation, Fig. 10 a front-end elevation, and Fig. 11 a rear-end elevation, of an improved apparatus for closing the end of the tube produced by the tube-forming mechanisms and providing its bottom end with its inward triangular side folds. Figs. 12 and 13 represent a turning-guide and moving folder, respectively, by perspective views, while Figs. 14, 15, and 16 represent their mode of operation. Figs. 17, 18, and 19 illustrate, by enlarged sectional views, taken respectively on the lines W, X, and Z of Fig. 8, the position of the bag-tube at various stages of its movement through the apparatus. Figs. 20, 21, 22, and 23 are diagrams illustrating the mode of forming the bottom seam of the bag. Figs. 24 to 30, inclusive, represent the bag-tube and the structure of the bag during various stages of its formation.

This invention consists in an apparatus whose mechanisms operate to close the end of a tubular and bellows-sided bag-blank to form the same into a bag, and to turn inwardly the corners of the inwardly-folded sides of said bag at the bottom end thereof, so as to provide the same with triangular folds, whereby the operation of opening the bag and converting it into square form to receive its contents is facilitated.

The present improvement also embraces various constructions and combinations of co-operating mechanisms whereby the bag is produced, all of which is too particularly hereinafter pointed out and claimed to need further preliminary description.

This improved apparatus is designed to be combined with a tube-producing machine substantially like that forming the subject-matter of the United States Patent No. 38,452, as improved by the structure forming the subject-matter of the United States Patent No. 138,144. Such a machine is illustrated in Figs. 1 and 2 of the said drawings, and will first be described in so far as the operations of converting a continuous web of paper into a bellows-sided tube and severing the same into bag-lengths are performed by it—namely, applying paste to one of its edges, turning the opposite sides centrally and uniting them to form a flat tube, turning the sides of such tube inwardly to form bellows-like folds, and cutting said tube into suitable bag-lengths.

The end of a web of paper wound upon a shaft or spool, 51, at one end of the machine has one edge led over a paste-disk, 52, is then directed under a forming-roller, 53, and thence passes under a former, 54, supported by a roller, 55, and onward through the machine into the nip of feeding or drawing rollers 56 57. These rollers are geared together by wheels 58, so as to run in unison, and are driven from a toothed wheel, 59, on the shaft 61, through a pinion, 60, on the shaft of one of them. The former 54 is provided at its rear end with undercut sides, forming a >-shaped recess, 62, as is seen in Fig. 3, in which recesses guide-bars 63 63 extend, while turning-fingers 64 64 overlie the top of said former. As the web of paper passes through these devices its central portion is held snugly against the under side of the former, while its sides are turned inwardly and outwardly by being forced into the recesses 62 62 by the guide-bars 63 63, and said sides of the web are laid down in succession upon the top of the former by the turning-fingers 64 64, so that they will be united by a central pasted seam. A tube will thus be formed whose transverse section will be that shown at Fig. 4, the plies of which will be pressed down flat, as in Fig. 5, in passing under the pressing-bars 65 65, that overlie the forward portion of said former. This tube will be drawn through the machine by the feeding-rollers 56 57 and advanced at a regular speed beyond the end of the former and into the nip of the carrying-rollers 66 67, which, geared together by wheels 70, are driven at an appropriate speed by a pinion, 75, and an intermediate, 72, from a pinion, 73, on the shaft 74 of roller 56. The end of the former is provided with a serrated cutter, 16, and is surmounted by a similar cutter, 76, with which co-operates a revolving striker, 77, that is hung on a shaft, 78, and revolved by a pinion, 79, geared by an intermediate, 80, to the toothed wheel 59. This striker operates in an upward direction, and by forcing the plies of the tube against the serrated cutters 16 76 severs a bag-length from said tube, so as to leave the lower ply extending beyond the upper ply, thus forming a projecting lip, 83, as in Fig. 24. This bag-length of tube, then in the embrace of the carrying-rollers 66 67, is carried to another set of frictionally-moved propelling-rollers, 68 69, that are driven by a pinion, 71, on the shaft of the roller 69, which roller is driven by a pinion, 81, on its end, that gears with an intermediate, 82, actuated by the pinion 75. These rollers, being thus driven at a speed slightly increased above that of the rollers 66 67, advance the said bag-length of tube and deliver it to the finishing apparatus constituting the present improvement.

The structure of this finishing apparatus will now be set forth, and then its adjustment with the tube-machine just described and its operation upon said bag-tube will be explained.

The mechanism for propelling the bag-tube through the apparatus consists of main feeding-rollers 28 29, auxiliary feeding-rollers 97 98, forwarding-rollers 32 35, and finishing delivering-cylinders 30 33, all of which rollers and cylinders are cut away or otherwise provided with narrow nipping-surfaces, as 9 9, &c., which seize the tube or bag upon lines just within the inner edges of the bellows-like side folds, thus bridging the central portion occupied by the freshly-pasted seam, and permitting a free manipulation of the said bellows-like side folds. These finishing delivering-cylinders 30 33 are geared together by toothed wheels 36 37 and driven by the latter, which is fixed on the main shaft 96. The forwarding-rollers 32 35 are run by frictional contact, the one 32 being driven from the wheel 36 by a toothed wheel, 99, on its shaft and a wide intermediate, 100. The auxiliary feeding-rollers 97 98 are geared together by toothed wheels 101 102, the latter of which receives motion from the wheel 37 through an intermediate, 128, and the main feeding-rollers 28 29 are geared together by wheels 86 87, and are driven by an intermediate, 90, from the wheel 102.

The lower one, 98, of the auxiliary feeding-rollers 97 98 is provided with wings 127 127, (see Figs. 6, 10, 21,) that co-operate with the folding-blade 88 in accomplishing the transverse or bottom fold of the bag, said wings forming a supporting-bed, as will be explained. The finishing delivering-cylinder 30 is also provided with wings 27, and the companion cylinder, 33, with wings 34, (see Fig. 11,) the former of which wings are constructed with depressions 126. These cylinders 30 33 act as pressing-cylinders to finish the bag. The depressions 126 receive the triangular folds and prevent the cylinders from so pressing said folds as to spring the sides of the bag open, and thus destroy the freshly-formed bottom-closing seam.

The turning-guides 45 46 are of peculiar construction. (See Figs. 12, 14.) Their shanks are formed so as to provide straight inner edges, which constitute thin knife-like guides 10, and their heads are formed so as to constitute separate inclined wings 1 2, the angle of whose union forms horizontal seats 11 11. The upper edges of these wings are inclined inwardly, so that their forward edges form a junction with said horizontal seats and with their knife-like inner edges. Said turning-guides are fixed in stationary positions abreast the forwarding-rollers 32 35, with their knife-like guiding-edges in the plane in which the bags travel by means of arms 140, their heads being a short distance in front of said rollers and their shanks extended rearwardly nearly to points opposite to the contact-point of the cylinders 30 33. Spring-seated pressers 227 129 are respectively hung by spring-arms to the upper and lower faces of the turning-guides, so as to project above and below the ends of said guides and embrace the rear ends of the same, (see Figs. 9 and 11,) the function of which will be presently explained.

The folders 47 48, Figs. 13 to 16, which co-operate with the turning-guides 45 46 in forming the triangular corner-folds, are also of peculiar structure. They are each constructed of metal plates, as 3 4 or 5 6, so shaped as to constitute a hollow angular-sided instrument, said plates 3 4 or 5 6 being united at one edge to form the straight surface 13, and spreading laterally to form transversely the angular figure <, whereby said folder is adapted to pass over the correspondingly-shaped heads 1 2 of the turning-guides 45 46. The leading ends of the united plates forming these folders are cut away at angles, so as to terminate in points 12, while the rear ends of these plates 3 4 or 5 6 are brought together and united to form the knife-like rear edges 15 15, whereby they are adapted to move rearwardly in the bellows side folds of the bag without injuring the same, as will presently appear. These folders 47 48 are attached by arms 7 8, respectively, to reciprocating carriages 17 18, that run in ways in the side frames, the said carriages being moved horizontally by means of connecting-rods 19 20, pivoted to arms 103 104, fast upon a shaft that is worked by an arm, 105, from a slotted cam-wheel, 21, on the main shaft 96.

At the receiving end of this apparatus it is provided with upper and lower or side guides, 40 50. The guide 40 is suspended from a brace-bar, 106, and cut away so as to rest between the narrow nipping-surfaces 9 9 of the feeding-rollers 28 29 and extend in the front and rear thereof. At its rear end this guide is upturned, as at 38, and at its front end its sides are spread and upturned angularly, as at 43, to permit the passage of the folders 47 48 in their rearward reciprocation. The lower guide, 50, is a plate of great width at its rear end, which is bent downward, as at 39, and it is fastened at its outer edges to the side frames by the bolts 107. Its central portion is a narrow tongue, 25, which passes between the narrow nipping-surfaces of the rollers 28 29, 96 97, and 32 35, and terminates between the latter rollers. This guide 50 is supplemented by a narrow swinging plate, 26, secured to its upper surface by a hinge, 14, and by a stationary plate, 44, secured to its under surface just behind said hinge. This latter plate projects rearwardly, and is united to the under side of the rearmost parts of the guide 50. Its forward ends, on opposite sides of the narrow or tongue portion 25 of the guide 50, are flared downwardly to permit the free passage of the folders 47 48 in their rearward movement, and its rear ends are so shaped as to clear the outer sides of the narrow nipping-surfaces of the rollers 28 29. The guide 50 and its plate 44 might, of course, be made in one piece, suitably shaped, and provided with recesses to escape contact with the narrow nipping-surfaces of the rollers 28 29.

Edge-guides 41 42 are also provided at the rear end of the apparatus, which guides, held in place by the screw-bolts 107, rest within the bellows-like side folds of the tube and properly direct it to the mechanisms. The guides 40 50 act as conductors to properly support the tube as it passes through the apparatus, and also perform the function of opening or spreading the mouth ends of the bellows side folds of the tube, and the edge-guides center the bag-tube in its passage into this apparatus, all of which will be more fully described.

The apparatus is further provided with a flexible swinging plate, 49, which is hung upon a rock-shaft, 108, that is properly vibrated by means of a rock-arm, 109, and a cam, 110. It is also provided with an upper swinging folding-jaw, 84, which is hung upon arms 130, projecting from a rock-shaft, 111, that is elastically depressed by a spring, 112, fast to its end and bearing upon the side frame, which shaft is properly vibrated by means of a rock-arm, 113, and a cam, 114.

The flexible swinging plate 49, in connection with the hinged plate 26, operates at the proper time to raise the mouth end of the tube into proper position for forming the fold for closing the bottom thereof.

The side wings, 127, with which the roller 98 is provided, constitute the lower folding-jaw, and with the upper folding-jaw, 84, constitute the female members of such a folding mechanism. The male member of this folding mechanism is a curved folding-blade, 88, hung by means of arms 92 to a rock-shaft, 116, that is vibrated at suitable intervals, through a rock-arm, 91, and a connecting-rod, 115, by the slotted cam 131. This folding-blade 88 is hung upon a shaft, 31, that is mounted so as to turn in bearings in the arms 92, it being provided at one end with a spring, 117, coiled about it and fastened to one of the arms 92, and at the other end with a rock-arm, 118, that travels in contact with a cam, 119, fixed to the side frame. This folding-blade has projecting from its rear face a suitably-shaped pasting-bar, 85, that, when the blade is in its upper position, rests in contact with a paste-roller, 93, and, when in its lower position, performing the folding operation, applies the paste with which it has been charged to the lip 83 of the bag-tube, which lip, folded onto the body of the tube, closes the same and forms a bag. This pasting-roller 93 is journaled in a paste-vat, 122, and is automatically moved a slight distance to present a fresh surface to the curved face of the pasting-bar of the folder during each descent of said folder, the means being a ratchet-wheel, 94; a dog, 123, a rock-arm, 124, and a connecting-rod, 95, fixed to an arm, 125, rising from the rocking lever 92. This paste-vat 122 is seated upon ears 135, projecting from the frame-work, and it and the mechanisms it carries may be adjusted with reference to the pasting folding-blade 88 by means of holding-screws 134.

The side guides, 41 42, are adjustable both laterally and longitudinally by means of slots and their holding-screws 107, so as to suit different widths of bags and guide the same to the proper extent into the nip of the feeding-rollers 28 29.

The folders 47 48 are adjustable laterally, as are the turning-guides 45 46, to suit different widths of bags—the former by means of their slotted arms 7 and holding-screws 142, by which they are secured to their carriages 17 18, and the latter by means of their bifurcated arms 140 and holding-plates, secured by screws 141, by which they are attached to the side frames.

The throw of the folding-blade 88 may be adjusted by means of its slots 144 and holding-screws 145, by which it is secured to its shaft 31. The several rollers 28 29 97 98 32 35 and cylinders 30 33 may be rendered adjustable for a like purpose by forming them in two parts, each part being adjustable on its shaft by hubs and nuts, as 150 160, Figs. 11 and 19.

The parts, being properly adjusted to suit the size of bag to be produced, will operate as follows: The bag-length of tube formed by the tube-machine is propelled onward by the propelling-rollers 68 69 toward the finishing apparatus, the receiving-guides 40 50 of which are in a plane slightly below that of the said rollers 68 69. The central portion of the upper ply of the open forward end of this tube first engages the upturned end 38 of the upper guide, 40, and its bottom ply rests upon the extended sides of the bottom guide, 50, (see Fig. 20,) thereby so bending its body portion as to spread apart its upper plies, and thus open its bellows sides at the leading end of the tube. As it is fed onward between these guides, its bellows sides, thus spread apart, embrace the side guides, 41 42, which center it with respect to the finishing mechanisms, so that they will properly act upon it. (See Fig. 17.) When it has moved forward into the embrace of the feeding-rollers 28 29 their narrow nipping-surfaces 9 seize it along the lines $a$ $a$, Fig. 24, or between the points, $c$ $c$, occupied by the inner edges of its bellows side folds and the border edges of its central pasted seam, $e$, whereby the seam $e$ is not injured and the bellows folds are left free to be distended, which rollers 28 29 propel it onward. As the tube is thus approaching the rollers 28 29 the folders 47 48 are moving rearwardly, and as the bag-tube is just emerging in front of said rollers the straight rear surface of the folders enter the bellows side folds of the tube, and said folders move rearwardly therein as the bag-tube is propelled forward. Said folders, reaching the position Fig. 8, then stand motionless, while the stud of their rock-arm 105 travels in the concentric part of the cam 21, and the bag-tube, controlled by the guides 41 42, its bellows folds spread apart by the folders 47 48 and supported by the downwardly-inclined sides 44 of the guides 50 and the upturned sides 43 of the guides 40, (see Fig. 18,) is propelled onward toward the auxiliary feeding-rollers 97 98. As the leading end of the tube is approaching these rollers the folding-bar 84, or upper member of the female folding device, is rocked downward to the position shown in Fig. 21, and the plate 49 is raised to the position there shown, thus carrying the swinging plate 26 with it, and forming with said plate an inclined guideway, whereby the entire mouth end of the tube is directed upward over the upper surface of the bar 84. The folding-blade 88, the pasting-bar 85 of which has been paste-charged by contact with the paste-roller 93, simultaneously moves downward, its time being such as to enable its face to force the flaring upper plies of the bellows folds down into contact with its lower plies. The rollers 97 98 will at the same time have so far revolved as to bring the wings 127 of the roller 98 to a point underneath the bar 84, so that as the folding-blade 88 strikes the forward end of the bag-tube said wings will co-operate with the face of said bar 84 and form with it the opposing members of the folding device, with which the blade 88 co-operates in doubling the end of the tube back onto its body portion, as in Fig. 22, the elasticity of the spring 112 on the bar 84 and that of the spring 117 on blade 88 causing these parts to perfectly co-operate. As the fold is thus made the bar 84 presses the overturned lip 83 against the face of the pasting-bar 85, thereby depositing paste upon said lip. The fold accomplished, the bar 84 and folding-blade 88 retreat upward, the bag is propelled into the nip of the rollers 97 98 and carried onward toward the rollers 32 35 and the folding-guides 45 46, the folders 47 48 being at the same time moved quickly forward to overtake the closed end of the tube. When the bottom fold is imparted to the bag its lip 83 is pasted down onto its body to form a bag, as in Fig. 25, and the rollers 97 98 force the outer ends of the doubled bottom edge $i$ of this bag against the seats 11 of the turning-guides 45 46, as in Fig. 14. The bag is thus momentarily arrested, and the folders 47 48, moving rapidly forward inside of its bellows side folds, operate upon it as follows: Their points 12 strike its bottom fold at the junctions thereof with the bellows side folds, and pressing thereon force its outer ends over the edges of the turning-guides, as in Fig. 15, thus causing the same to fold inwardly and into the space provided between the plates 3 4 or 5 6, composing said folders, the inclined forward edges of these plates and the knife-like edges of the turning-guides constituting folders, over which the paper is lapped to form triangular inward folds $o$ at the sides of the bottom, Fig. 27, as said folders 47 48 pass over the guides 45 46, as in Fig. 16. The folders 47 48 then retreat to repeat the operation on the next incoming bag-tube, and the bag just operated upon is propelled onward toward the finishing-cylinders 30 33, its triangular inward bottom folds lying snugly against the sides of its bellows side folds, and both embracing the sides and edges of the turning-guides 45 46, which bottom folds and side folds, as they pass onward over these guides, are laid flat or brought together by the pressing operation of the spring-pressers 129 227, which incline toward the tapered ends of said guides for that purpose. As the bag leaves these guides 45 46 it at once enters between the cylinders 30 33, which nip it and feed it out of the machine, the plane surfaces of their wings 27 34 pressing the parts snugly together, while their recesses 126 provide for the increased thickness constituted by the triangular folds and their narrow surfaces 9 protecting the fresh longitudinal seam.

While nothing is claimed herein that is shown or described in my companion application filed of even date herewith,

What is claimed is—

1. The combination, with the feeding-rollers 68 69, of the guide 40, having an upturned end, 38, said guide standing in a plane below that of the said rollers, substantially as described.

2. The combination, with the feeding-rollers 68 69, of the guides 40 and 50, which are placed in a plane below that of said rollers, substantially as described, and for the purpose set forth.

3. The combination, with the rollers 68 69 28 29 and guides 40 50, of the side guides, 41 42, adapted to enter the bellows side folds of the bag-tube and center the same, substantially as described.

4. The combination, with the moving folders 47 48 and feeding-rollers 28 29, of the flaring sides 43 44 of the guides 40 50, substantially as described.

5. The combination, with the folding-bar 84, of the swinging plate 49, operating to guide the leading end of the tube in its forward movement up and over the said bar 84, substantially as described.

6. The combination of the folding-bar 84, swinging plate 49, and folding-blade 88, substantially as described.

7. The combination of the folding-bar 84, roller 98, having wings 127, swinging plate 49, and folding-blade 88, substantially as described.

8. The combination, with the swinging plate 49 and guide 50, of the hinged plate 26, substantially as described.

9. The combination of the swinging plate 49, hinged plate 26, folding-bar 84, and folding-blade 88, substantially as described.

10. The combination of the swinging plate 49, hinged plate 26, folding-blade 88, bar 84, and winged roller 98, substantially as described.

11. The combination, with the fixed turning-guides 45 46, having guides 10 and seats 11, of the reciprocating angular folders 47 48, substantially as described.

12. The folders 47 48, constructed with side plates, 3 4 or 5 6, united together so as to provide a straight inner surface, 13, a pointed and open angular forward end, and a pointed and closed rear end, 15, substantially as described.

13. The combination, with the turning-guides 45 46, of the spring-plates 129 227, arranged to press the material upon said guides, substantially as described.

14. The combination, with the turning-guides and folders, of the finishing-cylinders 30 33, having wings, as 27 34, the wings 27 whereof have recesses 126, substantially as described.

15. The combination, with the laterally-adjustable turning-guides and folders, of the sectional feeding rollers and cylinders, each constructed in two parts, so as to be laterally adjustable, substantially as described.

16. The combination, with forwarding-rollers, as 32 35, whereby a bag-length with a closed bottom end is propelled onward, of turning-guides, as 45 46, and means for distending the bellows side folds of the bag, whereby the outer portions of said bottom end are forced rearward, so as to form triangular inward folds, all substantially as described.

In testimony whereof I have signed my name to this specification in the presence of two subscribing witnesses.

HENRY A. HOUSE.

Witnesses:
 H. T. MUNSON,
 GEO. H. GRAHAM.